United States Patent
Giorgini et al.

(10) Patent No.: US 9,574,583 B2
(45) Date of Patent: *Feb. 21, 2017

(54) HYDRAULIC SERVO-CONTROL OF A SERVO-CONTROLLED GEARBOX

(71) Applicant: Magneti Marelli S.p.A., Corbetta (IT)

(72) Inventors: Stefano Giorgini, Minerbio (IT); Andrea Bersani, San Giovanni in Persiceto (IT); Luca Bovina, Casalecchio di Reno (IT)

(73) Assignee: Magneti Marelli S.p.A., Corbetta (IT)

( * ) Notice: Subject to any disclaimer, the term of this patent is extended or adjusted under 35 U.S.C. 154(b) by 512 days.

This patent is subject to a terminal disclaimer.

(21) Appl. No.: 13/870,217

(22) Filed: Apr. 25, 2013

(65) Prior Publication Data

US 2013/0312597 A1 Nov. 28, 2013

(30) Foreign Application Priority Data

Apr. 27, 2012 (IT) .............................. BO2012A0233

(51) Int. Cl.
 F15B 1/24 (2006.01)
 F15B 15/00 (2006.01)
 F15B 1/02 (2006.01)
 F16H 61/00 (2006.01)

(52) U.S. Cl.
 CPC .............. *F15B 15/00* (2013.01); *F15B 1/024* (2013.01); *F15B 1/24* (2013.01); *F15B 2201/205* (2013.01); *F15B 2201/312* (2013.01); *F15B 2201/60* (2013.01); *F16H 2061/0034* (2013.01)

(58) Field of Classification Search
 None
 See application file for complete search history.

(56) References Cited

U.S. PATENT DOCUMENTS

| | | | | |
|---|---|---|---|---|
| 3,537,357 A | * | 11/1970 | Packer | 92/90 |
| 4,693,276 A | * | 9/1987 | Fulmer | 138/31 |
| 6,332,477 B1 | * | 12/2001 | Scholl et al. | 138/31 |
| 6,945,613 B1 | * | 9/2005 | Beck et al. | 303/191 |
| 2004/0238054 A1 | * | 12/2004 | Weber | 138/31 |

FOREIGN PATENT DOCUMENTS

| | | |
|---|---|---|
| DE | 10143830 A1 | 3/2003 |
| EP | 2 631 493 A1 | 8/2013 |
| EP | 2 631 494 A1 | 8/2013 |
| FR | 2784948 * | 4/2000 |

OTHER PUBLICATIONS

Italian Search Report BO20120233 dated Apr. 27, 2012.
Jul. 29, 2014 European Office Action for Application No. 13 165 031.9-1751.

* cited by examiner

*Primary Examiner* — F. Daniel Lopez
(74) *Attorney, Agent, or Firm* — Howard & Howard Attorneys PLLC

(57) ABSTRACT

A hydraulic servo-control of a servo-controlled gearbox provided with a hydraulic accumulator, having an outer housing and a piston that is slidable axially inside the outer housing and adapted to define a first variable-volume chamber for a gaseous material and a second variable-volume chamber for a control fluid under pressure; and at least one limit stop arranged at an open end of the outer housing which serve as a lower limit stop element; wherein the outer housing is provided with an upper limit stop element, which acts to limit the pressure value inside the first variable-volume chamber within a predetermined safety range.

7 Claims, 4 Drawing Sheets

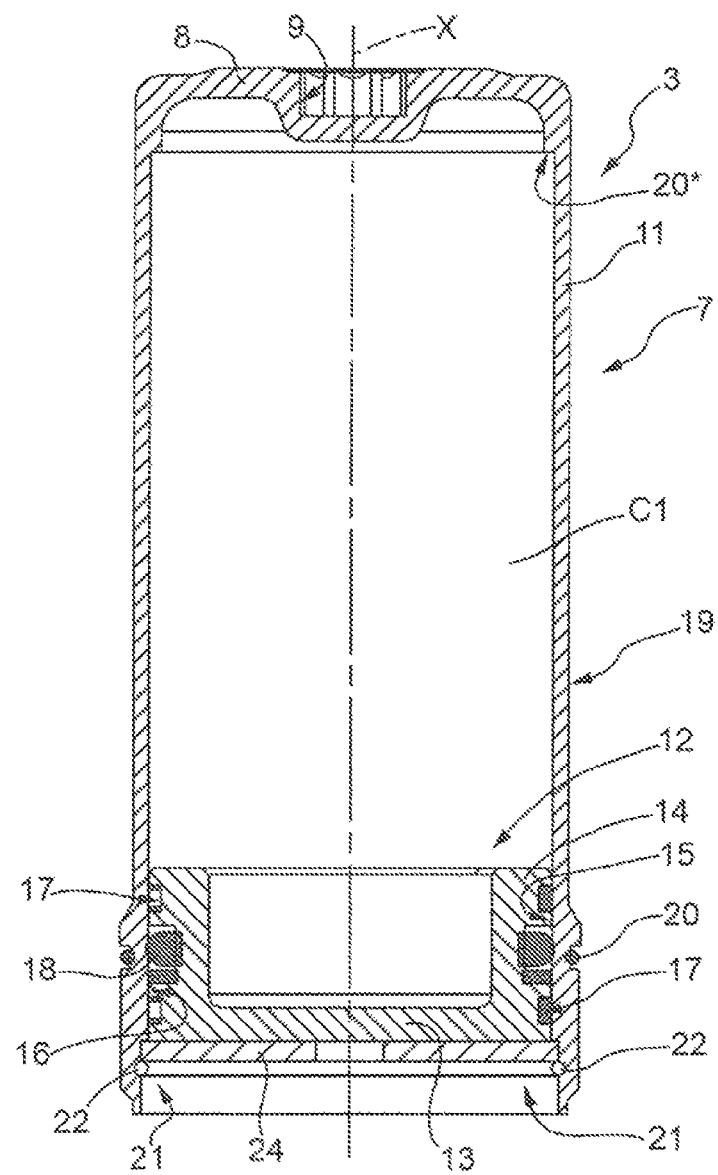
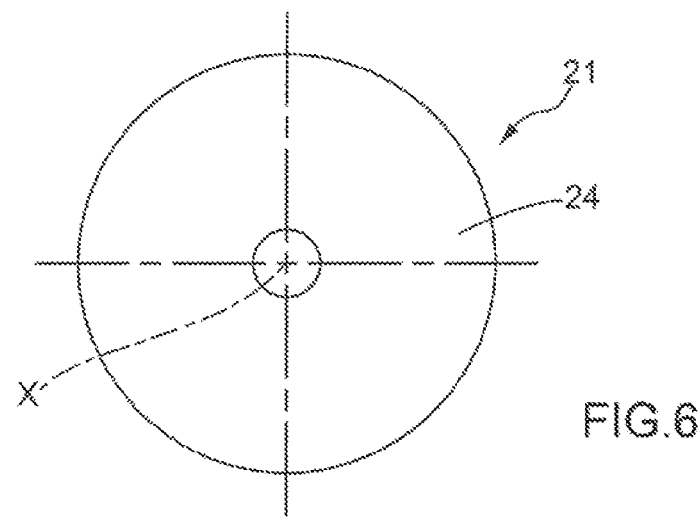
FIG.5
FIG.6

HYDRAULIC SERVO-CONTROL OF A SERVO-CONTROLLED GEARBOX

REFERENCE TO RELATED APPLICATION

This application is based upon and claims priority to Italian Patent Application BO2012A 000233 filed on Apr. 27, 2012.

BACKGROUND OF INVENTION

1. Field of Invention

The present invention relates to a hydraulic servo-control of a servo-controlled gearbox.

2. Description of Related Art

Servo-controlled gearboxes have become increasingly widespread and are structurally similar to a traditional manual gearbox except in that the clutch pedal and the gear changing stick operated by the driver are replaced by corresponding electric or hydraulic servo-controls.

Using a servo-controlled manual gearbox, the driver only needs to send the order to shift to a higher gear or to a lower gear to a gearbox control unit and the gearbox control unit autonomously changes gear acting on both the engine and the servo-controls associated with clutch and gearbox.

Generally, the gearbox servo-control is of the hydraulic type and acts on a gearbox control shaft for transmitting both an axial displacement (i.e. along a central axis) for selecting the gear range, and a rotation about the central axis for engaging and disengaging the single gears, to the control shaft itself. Accordingly, the gearbox servo-control includes a linear hydraulic actuator mechanically coupled to the control shall for axially displacing the control shaft, and a rotary hydraulic actuator mechanically coupled to the control shaft for rotating the control shaft.

The gearbox servo-control further comprises a storing tank containing the control fluid used by the hydraulic actuators (typically oil) at room pressure, a hydraulic accumulator containing control fluid under pressure, a motor pump which draws the control fluid from, the storing tank and feeds the control fluid under pressure to the hydraulic accumulator, and a number of solenoid valves, which are adapted to selectively connect the chambers of the hydraulic actuators to the storing task and to the hydraulic accumulator.

Hydraulic accumulators of the known type comprise an outer housing which is internally divided into a first variable-volume chamber adapted to accommodate the control fluid and a second variable-volume chamber adapted to receive a gas under pressure (typically $N_2$).

The division between the first and the second chambers is typically carried put by partition means arranged inside the outer housing, axially mobile inside the outer housing itself between an upper limit stop position and a lower limit stop position so as to vary the volumes of the first and second chamber, respectively, defined inside the outer housing. In particular, the partition means may comprise, for example, a bellows element made of a metal material, or a flexible partition membrane or even a piston.

In particular, hydraulic accumulators have become increasingly employed, which are provided with an outer housing shaped as a cup-shaped body, and with a piston arranged inside the outer housing, made axially sliding and mobile inside the outer housing itself.

While the above-described hydraulic accumulators are simple and inexpensive to be implemented, they have however the drawback that, if a traumatic and large damage occurs downstream of the hydraulic accumulator itself (e.g. a damage of about 10 mm in a piping, resulting in a considerable leakage of control fluid), a depression is generated such as to remove the partition means from the dedicated seat obtained into the outer housing and cause damage to the whole hydraulic servo-control.

SUMMARY OF INVENTION

The object of the present invention is to provide a hydraulic servo-control of a servo-controlled gearbox which hydraulic servo-control allows the drawbacks of the prior art to be overcome while being simple and cost-effective to be implemented.

To this end, the hydraulic servo-control of the present invention includes a plurality of hydraulic actuators having respective chambers and a storing tank containing control fluid used by the hydraulic actuators at room pressure. A hydraulic accumulator includes an outer housing having an axis (X) and a piston, which is moveable inside the outer housing, so as to slide along the axis (X). The piston is adapted to define, inside the outer housing, a first variable-volume chamber (C1) for a gaseous material and a second variable-volume chamber (C2) for a control fluid under pressure. A limit stop, which is located at an open end of the outer housing, serves as a lower limit stop element for the travel of the piston inside the outer housing itself. A motor pump draws the control fluid from the storing tank and feeds the control fluid under pressure to the hydraulic accumulator. A number of solenoid valves are adapted to selectively connect the chambers of the hydraulic actuators to the storing tank and to the hydraulic accumulator. The outer housing has an upper stop element for the travel of the piston inside the outer housing itself. The upper stop element is located at a height of the outer housing determined so as to limit the pressure value inside the first-variable chamber (C1) within a safety range between, for example, an initial pressure of 55 bar and a final pressure of 135 bar.

BRIEF DESCRIPTION OF THE DRAWINGS

The present invention will now be described with reference to the accompanying drawings, which show a non-limiting example thereof, in which:

FIG. 5 is a sectional view of a second embodiment of a hydraulic accumulator of the servo-control illustrated in FIG. 1; and FIG. 6 is a plan view of a detail of the hydraulic accumulator of the servo-control illustrated in FIG. 5.

DETAILED DESCRIPTION OF EMBODIMENT(S) OF INVENTION

Figure 1:
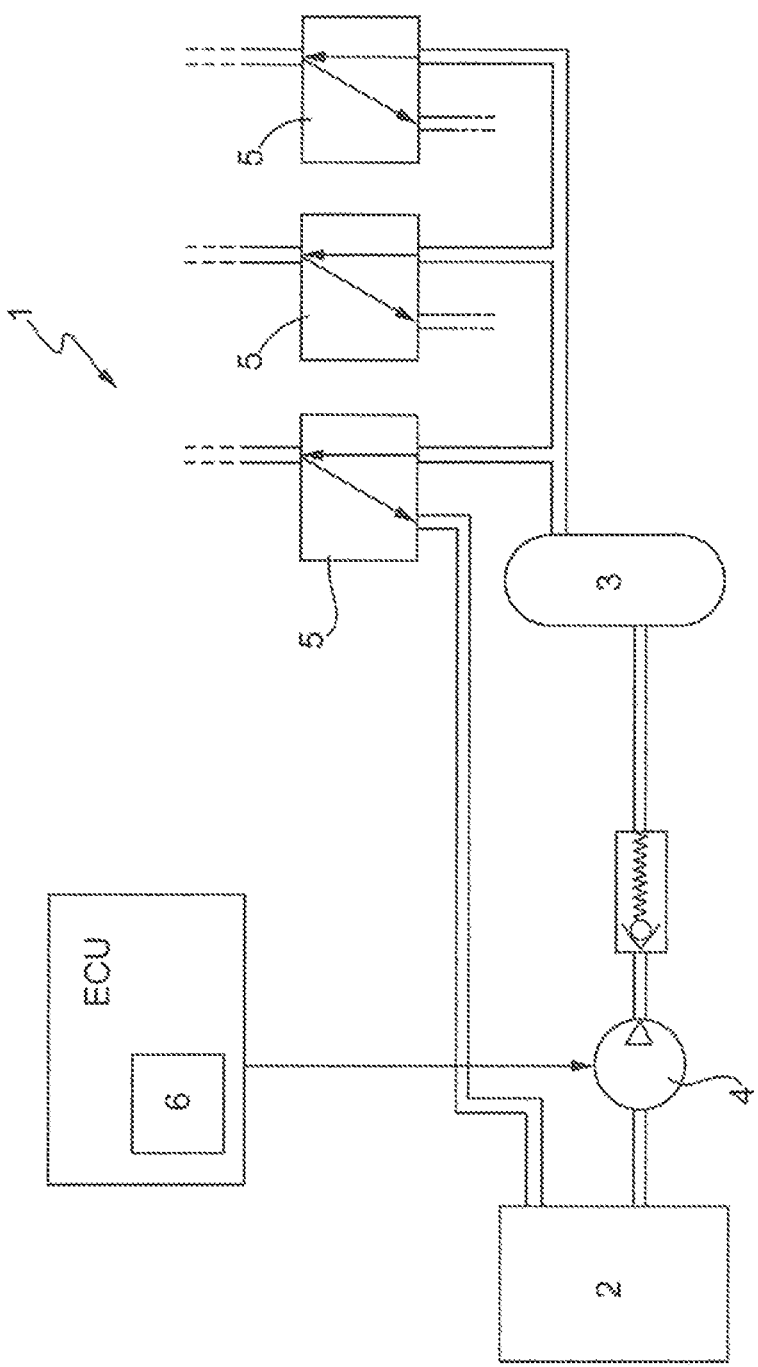
FIG. 1 is a functional electric and hydraulic diagram of a hydraulic servo-control of a servo-controlled gearbox according to the present invention.

In FIG. 1, reference numeral 1 indicates as a whole a servo-control for a gearbox, which is provided with a control shaft (not shown). Servo-control 1 includes a storing tank 2 containing the control fluid (typically oil) at room pressure used by a number of hydraulic actuators (not shown) coupled to the control shaft and suited to axially displace the control shaft and to rotate the control shaft about a central axis.

Servo-control 1 includes an electronic control unit ECU, which is suited to feedback-pilot the hydraulic actuators and transmit a linear and/or rotary motion to the control shaft as a function of the signals related to the axial and angular position of the control shaft, which are transmitted by a number of sensors facing the control shaft itself.

Servo-control 1 also includes a hydraulic accumulator 3 containing control fluid under pressure and a motor pump 4 which draws the control fluid from the storing tank 2 and feeds the control fluid under pressure to the hydraulic accumulator 3.

In addition, Servo-control 1 includes a number of solenoid valves 5, which are adapted to selectively connect the hydraulic actuators to the storing tank 2 and to the hydraulic accumulator 3.

In particular, the hydraulic actuators are provided with a chamber (not shown) with which a respective three-way solenoid valve 5 is associated. Each three-way solenoid valve 5 is suited to selectively carry out a number of functions. In particular, the solenoid valve 5 keeps the respective chamber insulated in order to keep the control fluid present inside the chamber itself constant. The solenoid valve 5 also connects the chamber to the storing tank 2 for discharging the control fluid present inside the chamber. The solenoid valve 5 also connects the chamber to the hydraulic accumulator 3 for feeding control fluid into the chamber.

In order to ensure a correct operation of the hydraulic actuators, i.e. to ensure that the hydraulic actuators provide their nominal performance, the pressure value of the control fluid inside the hydraulic accumulator 3 is required to always be between a minimum value and a maximum value. Accordingly, the electronic control unit ECU is suited to actuate the motor pump 4 when the pressure value of the control fluid inside the storing tank 2 is lower than the minimum value and to deactivate the motor pump 4 when the pressure value of the control fluid inside tank 2 is higher than the maximum value.

The electronic control unit ECU includes an assessment device 6 which is adapted to assess the pressure value of the control fluid inside the hydraulic accumulator 3 without resorting to a direct measurement of the pressure value itself (i.e. without using a dedicated pressure sensor). In particular, the assessment device 6 assesses the pressure value of the control fluid inside the hydraulic accumulator 3 as a junction of a number of operating parameters of the motor pump 4 and of the hydraulic actuators.

Figure 2:
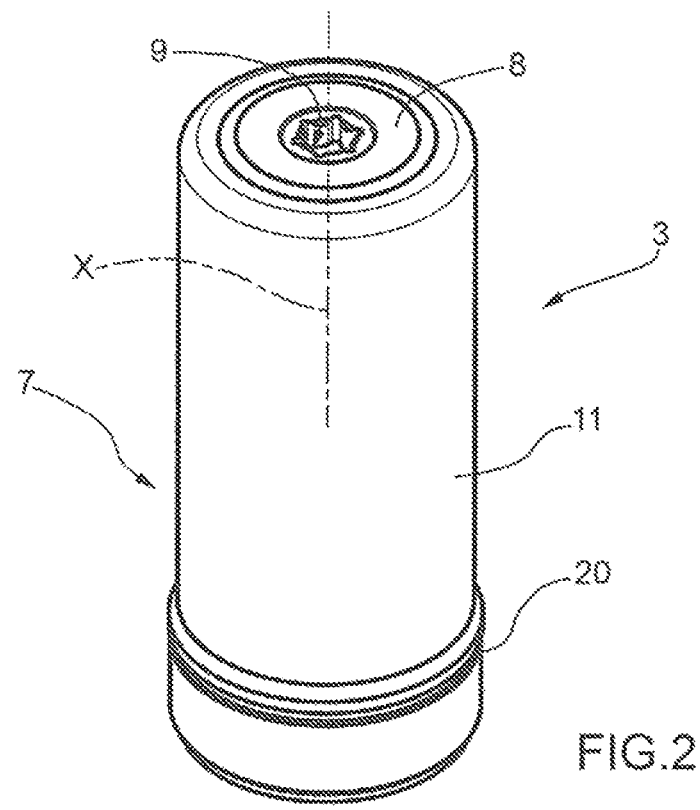
FIG. 2 is a side elevation perspective view of a hydraulic accumulator of the servo-control illustrated in FIG. 1.
Figure 3:
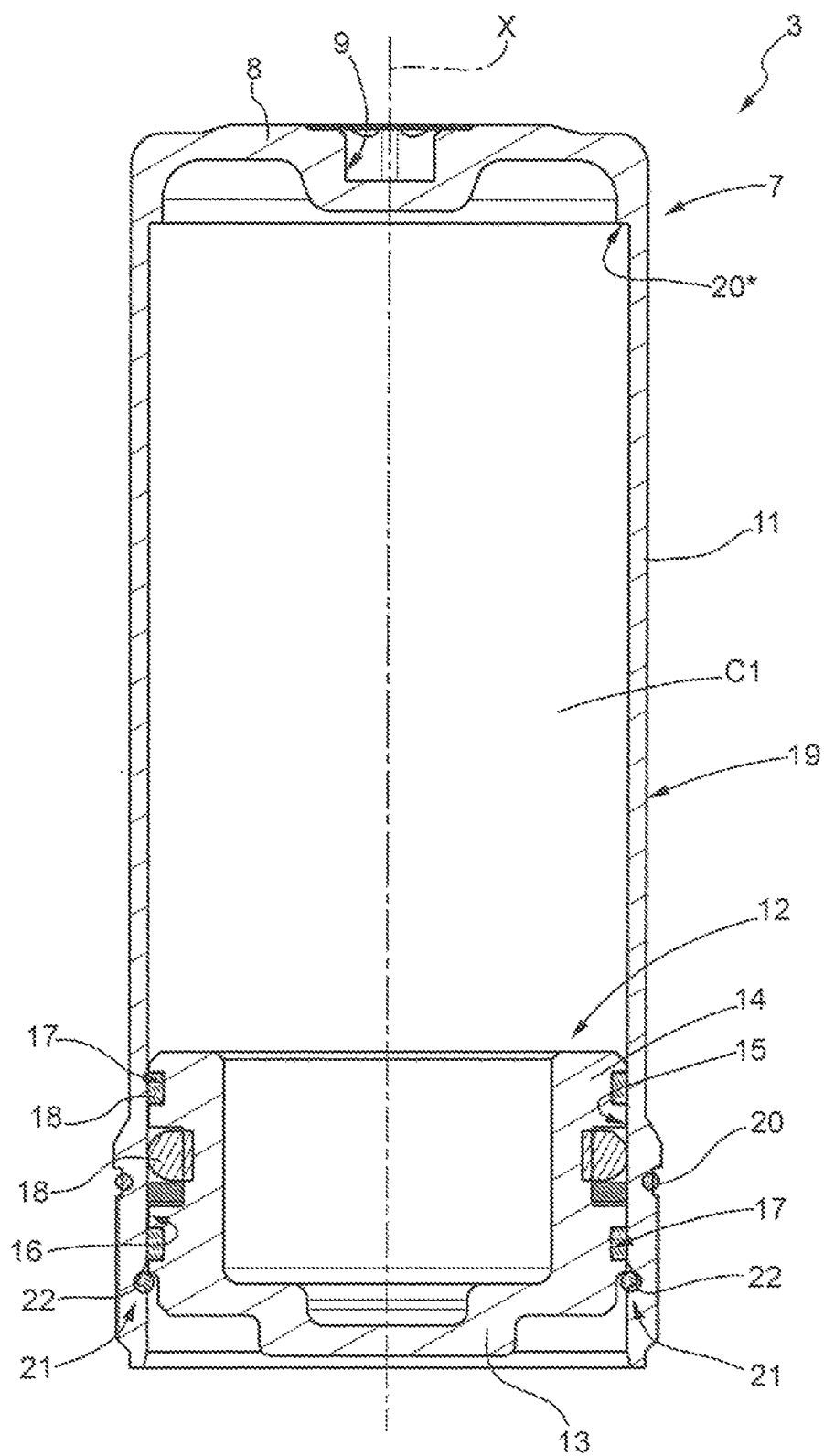
FIG. 3 is a sectional view of a first embodiment of the hydraulic accumulator of the servo-control illustrated in FIG. 2.

FIGS. 2 and 3 show a first embodiment of the hydraulic accumulator 3 in detail. The hydraulic accumulator 3 includes an outer housing 7 made of a metal material having a cup-shaped body with cylindrical symmetry and provided with an axis X. The outer housing 7 includes an upper wall 8 provided with a central recess 9. Moreover, the outer housing 7 includes a lateral cylindrical wall 11 coaxial to axis X.

A piston 12 is arranged, in use, inside the outer housing 7, which piston is made of a metal material, is axially sliding along axis X and mobile inside the outer housing 7. Piston 12 defines a variable-volume chamber C1 inside the outer housing 7 which, in a preliminary step of assembling the hydraulic accumulator 3, is filled with a gaseous material (preferably $N_2$). Piston 12 further defines a variable-volume chamber C2 which is suited to be filled with the control fluid, where said two chambers C1 and C2 are separated by piston 12.

Piston 12 has a cylindrical symmetry body, coaxial to axis X and includes a base wall 13 and a lateral cylindrical wall 14. The lateral cylindrical wall 14 is provided with an outer cylindrical surface 15 coaxial to axis X, the diameter of which approximates the diameter of an inner cylindrical surface 16 coaxial to axis X of the outer housing 7.

A number of seats 17 are located on the outer surface is of the piston, which are adapted to accommodate a plurality of annular-shaped gasket elements 18, coaxial to axis X, made of a plastic material and suited to allow the sliding of piston 12 inside the outer housing 7 to be improved and the control fluid leaks to be prevented.

According to a one embodiment of the present invention, a pilot cut is located on an outer cylindrical surface 19 of the outer housing 7 for accommodating a sealing ring 20, and is coaxial to axis X and made of a plastic material. The sealing ring 20 is arranged close to the open end of the outer housing 7.

Piston 12 is slidably moveable along axis X and within the outer housing 7. Piston 12 is movable between an upper limit stop position defined by an upper limit stop element 20* and a lower limit stop position, and vice versa. According to one embodiment, the upper limit stop element 20* is provided as a shoulder coaxial to axis X located in the inner surface 16 of the lateral cylindrical wall 11 of the outer housing.

The lower limit stop position is defined by the presence of the limit stop means 21. The limit stop means 21 in turn includes a circlip 22 (also known as C-clip) having a substantially annular shape, coaxial to axis X and preferably made of elastic steel. Circlip 22 is arranged in use inside a dedicated seat located in the inner cylindrical surface 16 of the outer housing 7. Circlip 22 projects towards the inside of the outer housing 7 so as to act as striker element for piston 12 which slides therein.

Figure 4:
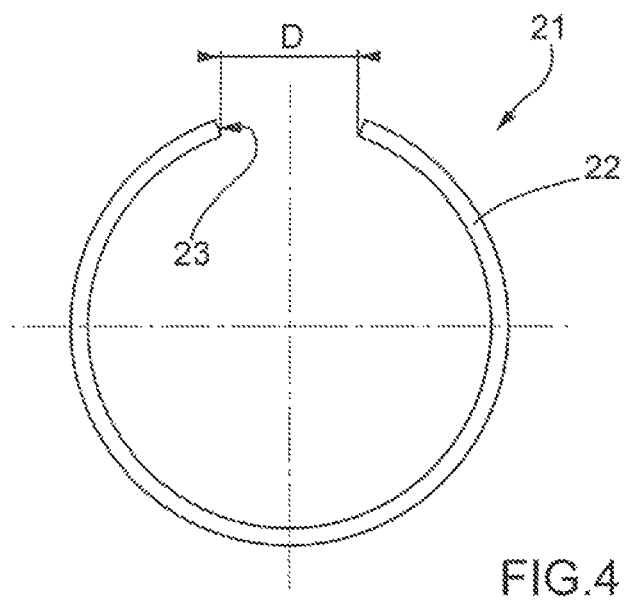
FIG. 4 is a plan view of a detail of the hydraulic accumulator of the servo-control illustrated in FIG. 2.

As best shown in FIG. 4, it should be noted that circlip 22 does not define a complete circumference but has an opening 23 that optimizes the assembly process of the hydraulic accumulator 3.

According to one embodiment, when circlip 22 is in an operating condition (i.e., when circlip 22 is inserted into the dedicated seat obtained in the inner cylindrical surface 16 of the outer housing 7), opening 23 of circlip 22 has a size D that is preferably smaller than 1 mm and preferably ranging from 0.6 mm to 1 mm.

It has been discovered that, in the condition in which the ends of circlip 22 which define opening 23 are arranged in contact with each other, it is essential that circlip 22 has an overall diameter which substantially approximates by excess the diameter of the inner cylindrical surface 16 of the outer housing 7. In other words, when circlip 22 is arranged with the ends defining the opening 23 in contact with each other, the overall diameter of circlip 22 is larger than the diameter of the inner cylindrical surface 16 of the outer housing 7.

This discovery is even more so verified when in use, i.e. when circlip 22 is inserted into the dedicated seat obtained in the inner cylindrical surface 16 of the outer housing 7.

In other words, even in the operating condition, circlip 22 has an overall diameter which substantially approximates by excess the diameter of the inner cylindrical surface 16 of the outer housing 7. It is also true that even when circlip 22 is inserted into the dedicated seat obtained in the inner cylindrical surface 16 of the outer housing 7, the overall diameter of circlip 22 is larger than the diameter of the inner cylindrical surface 16 of the outer housing 7.

The step of assembling the hydraulic accumulator 3 takes place in an environment at a pressure of about 30 bar, in which chamber C1 is filled with a gaseous material (preferably N2) and piston 12 is inserted into the outer housing 7. Once piston 12 has been inserted, circlip 22 is also fitted into its dedicated seat. Since the opening 23 of circlip 22, when in use, has its ends at a short distance from each other, the two ends of circlip 22 itself must be diverted by slightly deforming it for allowing the assembly.

In a similar manner, it has been discovered that making the overall diameter of circlip 22 substantially approximate by excess the diameter of the inner cylindrical surface 16 of the outer housing 7, in use, circlip 22 cannot be removed from its seat obtained in the inner cylindrical surface 16 of the outer housing 7. Thus, even in the unfortunate case of a traumatic and large damage of the conduits located downstream of the hydraulic accumulator 3 and of a considerable depression, the travel of piston 12 is in any ease stopped by the presence of circlip 22.

The hydraulic accumulator 3 shown in FIG. 3 is similar to that shown in FIGS. 5 and 6 and the corresponding parts thereof are indicated, where possible, with the same reference numerals.

In particular, according to the embodiment shown in FIG. 5, the limit stop means 21 also includes a perforated plate 24, which is interposed in use between the annular circlip 22 and piston 12. According to what shown in FIG. 6, the perforated plate 24 has a discoid shape with a reduced thickness, is coaxial to axis X and has a diameter substantially approximating by defect the size of the inner cylindrical surface 16 of the outer housing 7. Plate 24 has a number of through holes or openings which define a hydraulic narrowing for the control fluid in case of possible and undesired damage to the conduits downstream of the hydraulic accumulator 3. It is also worth noting that the perforated plate 24 is not provided with sealing elements and/or gaskets.

According to one embodiment, the perforated plate 24 has a single through opening, coaxial to axis X, which has such a size as to define a hydraulic narrowing for the control fluid in case of possible and undesired damage to the conduits downstream of the hydraulic accumulator 3.

It is also worth noting that according to this variant, opening 23 of circlip 22 acts to optimize the process of assembling the hydraulic accumulator 3 and may have a size smaller than or equal to 20 mm, but preferably ranging from 14 mm to 20 mm.

Also in this case, the step of assembling the hydraulic accumulator 3 takes place in an environment at a pressure of about 30 bar in which chamber C1 is filled with a gaseous material (preferably N2) and piston 12 is inserted into the outer housing 7. Once piston 12 has been inserted, the perforated plate 24 and then, circlip 22 are also fitted into the dedicated seat thereof. According to this embodiment, since opening 23 of circlip 22 has a size smaller than or equal to 20 mm but preferably ranging from 16 mm to 20 mm, diverting circlip 22 itself (by slightly deforming it before its insertion into the seat) is not required.

According to another embodiment, the limit stop means 21 may include the perforated plate 24, which is interposed in use between circlip 22 and piston 12. It is worth noting that according to this variant, in order to further improve the reliability of the hydraulic accumulator 3, opening 23 of circlip 22 made for optimizing the process of assembling the hydraulic accumulator 3 when in use (i.e., once circlip 22 has been inserted into the seat obtained within the outer housing 7) preferably has a size smaller than or equal to 10 mm.

Also in this case, the step of assembling the hydraulic accumulator 3 takes place in an environment at a pressure of about 30 bar, in which the chamber is filled with a gaseous material (preferably $N_2$) and piston 12 is inserted into the outer housing 7. Once piston 12 has been inserted, the perforated plate 24 and then, circlip 22 are also fitted. According to this embodiment, since opening 23 of circlip 22, when in use (i.e., once circlip 22 has been inserted into the seat obtained in the outer housing 7), has a size that is typically smaller than or equal to 10 mm. The two ends of circlip 22 itself need to be diverted by slightly deforming it in order to insert it into its respective seat.

As mentioned above, piston 12 is movable within the outer housing 7 between an upper limit stop position defined by the upper limit stop element 20*  and the lower limit stop position defined by the limit stop means 21.

The upper limit stop element 20* is located in an inner surface 16 of the outer housing at a closed end of the outer housing 7. In other words, the upper limit stop element 20* is located close to the upper wall 8 of the outer housing 7. The upper limit stop element 20* is located at an end of the outer housing 7 opposite to the end at which the limit stop means 21 are located.

The position of the upper limit stop element 20* on which piston 12 abuts is determined so as to keep the pressure value inside the variable-volume chamber C1 within a predetermined safety range in any condition. In other words, the upper limit stop element 20* is provided at a height of the outer housing which is determined so as to keep the pressure value inside the variable-volume chamber C1 within a predetermined safety range in any condition.

According to the embodiment shown in FIGS. 3 and 5, the upper limit stop element 20* is defined by a shoulder located in the inner surface 16 at a height of the outer housing which is determined so as to keep the pressure value inside the variable-volume chamber C1 within a predetermined safety range in any condition.

The upper limit stop element 20* therefore serves as pressure limiter inside the variable-volume chamber C1.

In other words, the travel of piston 12 inside the outer housing 7 between the upper limit stop position (defined by the upper limit stop element 20*) and the lower limit stop position (defined by the limit stop means 21) most be such as to allow the pressure value inside the variable-volume chamber C1 to be kept within the predetermined safety range in any condition.

It has been experimentally proven that limiting the pressure value inside the variable-volume chamber C1 for the gaseous material between 55 and 135 bar, preferably between 70 and 120 bar, allows the speed and/or acceleration of piston 12 which impacts against the limit stop means 21 to be limited, if a traumatic and large damage occur in the conduits downstream of the hydraulic accumulator 3 itself (e.g. a damage of about 10 mm that results in a considerable leakage of control fluid), thus generating a considerable depression.

Due to the presence of the perforated plate 24 and/or to the size of the opening 23 in circlip 22 and/or to the position of the upper limit stop element 20*, if a traumatic and large damage occurs in the conduits downstream of the hydraulic accumulator 3 itself (e.g. a damage of about 10 mm that results in a considerable leakage of control fluid) and a considerable depression is thus generated, the travel of piston 12 is however stopped by the presence of the limit stop means 21.

It has been seen that with an opening 23 in circlip 22 which, when in use (i.e., once circlip 22 has been inserted into the seat obtained in the outer housing 7), has a size smaller than or equal to 10 mm, and/or with the presence of the perforated plate 24, the limit stop means 21 cannot be removed from the respective seat.

Thereby, damage to the whole hydraulic servo-control 1 can be avoided, and the above-described servo-control 1 is simultaneously cost-effective, easy to be implemented and reliable.

It should be appreciated by those having ordinary skill in the related art that the hydraulic servo-control has been described above in an illustrative manner. It should be so appreciated also that the terminology that has been used above is intended to be in the nature of words of description rather than of limitation. It should be so appreciated also that many modifications and variations of the hydraulic servo-control are possible in light of the above teachings. It should be so appreciated also that, within the scope of the appended claims, the hydraulic servo-control may be practiced other than as specifically described above.

What is claimed is:

1. A hydraulic servo-control of a servo-controlled gearbox comprising:
    a plurality of hydraulic actuators having respective chambers;
    a storing tank containing control fluid used by the hydraulic actuators at room pressure;
    a hydraulic accumulator including an outer housing having an axis (X) and comprising a lateral cylindrical wall coaxial to the axis (X) and an upper wall; and a piston, which is moveable inside the outer housing so as to slide along the axis (X), said piston acting to define, inside the outer housing, a first variable-volume chamber (C1) for a gaseous material and a second variable-volume chamber (C2) for a control fluid under pressure; and a lower stop element is located at an open end of the outer housing and serves to limit the travel of the piston inside the outer housing;
    a pump, which draws the control fluid from the storing tank and feeds the control fluid under pressure to the hydraulic accumulator;
    a number of solenoid valves, which are adapted to selectively connect the chambers of the hydraulic actuators to the storing tank and to the hydraulic accumulator;
    the outer housing has an upper stop element for the travel of the piston inside the outer housing, the upper stop element being provided as a shoulder coaxial to the axis (X) obtained in an inner surface of the lateral cylindrical wall of the outer housing and arranged in proximity to the upper wall; the piston is provided movable between an upper stop position defined by the upper stop element and a lower stop position defined by the lower stop element; said lower stop element including a circlip having a annular shape and a perforated plate, which is interposed in use between the circlip and the piston, and wherein the perforated plate is not provided with sealing elements and/or gaskets.

2. The servo-control as set forth in claim 1, wherein the perforated plate has a discoid shape with a diameter approximating the size of an inner surface of the outer housing, and has at least one through hole, which acts to define a hydraulic passage for the control fluid.

3. The servo-control as set forth in claim 1, wherein the perforated plate is provided with a single through opening, which is coaxial to the axis (X) and has a size that acts to define a hydraulic passage for the control fluid.

4. The servo-control as set forth in claim 1, wherein the lower limit stop includes a ring-shaped circlip having a having an opening.

5. The servo-control as set forth in claim 4, wherein the opening in said ring-shaped circlip has a size that is less than or equal to 1 mm.

6. The servo-control as set forth in claim 4, wherein the opening in said ring-shaped circlip has a size that is less than or equal to 20 mm.

7. The servo-control as set forth in claim 1, wherein the circlip has an annular shape that is accommodated in an inner surface of the outer housing, so as to project towards the interior of the outer housing.

\* \* \* \* \*